United States Patent
Li et al.

(10) Patent No.: US 9,961,446 B2
(45) Date of Patent: May 1, 2018

(54) EARPHONE RECOGNITION METHOD AND APPARATUS, EARPHONE CONTROL METHOD AND APPARATUS, AND EARPHONE

(71) Applicant: YULONG COMPUTER TELECOMMUNICATION SCIENTIFIC (SHENZHEN) CO., LTD., Shenzhen, Guangdong (CN)

(72) Inventors: Gao Li, Guangdong (CN); Jincun Lin, Guangdong (CN); Sheng Yang, Guangdong (CN); Yihua Liu, Guangdong (CN)

(73) Assignee: YULONG COMPUTER TELECOMMUNICATION SCIENTIFIC (SHENZHEN) CO., LTD., Guangdong (CN)

( * ) Notice: Subject to any disclaimer, the term of this patent is extended or adjusted under 35 U.S.C. 154(b) by 0 days. days.

(21) Appl. No.: 15/325,801

(22) PCT Filed: Aug. 27, 2014

(86) PCT No.: PCT/CN2014/085347
§ 371 (c)(1),
(2) Date: Jan. 12, 2017

(87) PCT Pub. No.: WO2016/029393
PCT Pub. Date: Mar. 3, 2016

(65) Prior Publication Data
US 2017/0150269 A1    May 25, 2017

(51) Int. Cl.
*H04R 5/04* (2006.01)
*H04R 29/00* (2006.01)
(Continued)

(52) U.S. Cl.
CPC ............... *H04R 5/04* (2013.01); *G01L 9/008* (2013.01); *H04R 5/033* (2013.01); *H04R 29/001* (2013.01)

(58) Field of Classification Search
CPC ........ H04R 5/04; H04R 5/033; H04R 28/001; H04R 2201/109; H04R 2420/03
(Continued)

(56) References Cited

U.S. PATENT DOCUMENTS

2006/0045304 A1    3/2006 Lee et al.
2008/0089539 A1    4/2008 Ishii
(Continued)

FOREIGN PATENT DOCUMENTS

CN    101166372 A    4/2008
CN    101765035 A    6/2010
(Continued)

OTHER PUBLICATIONS

International Search Report dated May 27, 2015 issued in PCT/CN2014/085347.

*Primary Examiner* — Melur Ramakrishnaiah
(74) *Attorney, Agent, or Firm* — Scully, Scott, Murphy & Presser, P.C.

(57) ABSTRACT

The present invention provides an earphone recognition method and an earphone recognition apparatus. The earphone recognition method includes: an acquisition step: when a user wears the earphone, acquiring left and/or right ear structure information, collected by the earphone, of the user; and a sending step: sending the left and/or right ear structure information to a terminal, so that the terminal determines whether the user correctly wears the earphone according to whether the left and/or right ear structure information matches left and/or right ear structure information acquired when the user correctly wears the earphone for
(Continued)

the first time. By means of the solutions of the present invention, even though the user wears the earphone conversely, the user can still hear proper high-quality sound, and further, the listening experience of the user is improved.

8 Claims, 7 Drawing Sheets

(51) Int. Cl.
 *H04R 5/033* (2006.01)
 *G01L 9/00* (2006.01)
(58) Field of Classification Search
 USPC .............................. 381/17–18, 71.6, 74, 306
 See application file for complete search history.

(56) References Cited

U.S. PATENT DOCUMENTS

| | | | |
|---|---|---|---|
| 2011/0051947 A1* | 3/2011 | Macours | H04R 5/04 381/71.6 |
| 2013/0208927 A1* | 8/2013 | Wang | H04R 1/1041 381/306 |
| 2013/0279724 A1* | 10/2013 | Stafford | H04R 1/1041 381/309 |

FOREIGN PATENT DOCUMENTS

| | | |
|---|---|---|
| CN | 102316394 A | 1/2012 |
| WO | WO 2012/153784 A1 | 11/2012 |

\* cited by examiner

EARPHONE RECOGNITION METHOD AND APPARATUS, EARPHONE CONTROL METHOD AND APPARATUS, AND EARPHONE

FIELD OF THE INVENTION

The present invention relates to the technical field of earphones, and in particular, to an earphone recognition method and apparatus, an earphone control method and apparatus, and an earphone.

BACKGROUND OF THE INVENTION

With the development of science and technology, the quality of music output by electronic devices is getting better and better, more and more users will use high-quality earphones to enjoy the music, browse videos and dial voice calls and the like, however, once the users wear the earphones conversely, the sound heard by the users will be very uncomfortable, and the quality of the stereo sound generated by the earphones will be greatly reduced.

Therefore, in order to prevent the users from wearing the earphones conversely, the current common means is to mark "L" and "R" on the earphones to distinguish left and right sound channels, but when wearing the earphones, the users often do not bother to distinguish the identification symbols "L" and "R" of the left and right sound channels on the earphones, moreover, in the case of dark environments or low light, it is difficult for the users to distinguish the left and right character identification symbols on the earphones, in addition, the identification symbols of the left and right sound channels on the earphones will be gradually worn and then disappear with the use of the earphones, therefore, even if "L" and "R" are marked on the earphones, the users often wear the earphones conversely, such that the experience effects of the users are poor.

Therefore, when the users wear the earphones conversely, how to enable the users to still hear proper high-quality sound and improve the auditory experience of the users becomes a problem to be solved urgently.

SUMMARY OF THE INVENTION

Just based on the above problem, the present invention provides a new technical solution, when a user wears an earphone conversely, the user can still hear proper high-quality sound, and then the auditory experience of the user is improved.

In view of this, in one aspect of the present invention, an earphone recognition method is provided, wherein the earphone recognition method includes: an acquisition step: when a user wears the earphone, acquiring left and/or right ear structure information, collected by the earphone, of the user; and a sending step: sending the left and/or right ear structure information to a terminal, so that the terminal determines whether the user correctly wears the earphone according to whether the left and/or right ear structure information matches left and/or right ear structure information acquired when the user correctly wears the earphone for the first time.

In the technical solution, when the user wears the earphone, the structure information of at least one of the left ear and the right ear collected by the earphone worn by the user is acquired, and the collected structure information is sent to the terminal, so that the terminal can compare the structure information with the structure information of the corresponding ear collected when the user correctly wears the earphone for the first time, and can determine whether the user wears the earphone conversely according to a comparison result, namely, when the structure information does not match the structure information of the corresponding ear collected when the user correctly wears the earphone for the first time, it indicates that the user wears the earphone conversely, and on the contrary, the user has correctly worn the earphone.

Wherein, the left and/or right ear structure information can be audio or video information reflecting a human ear structure.

In the above technical solution, preferably, the earphone includes a piezoelectric film sensor, the piezoelectric film sensor includes an audio control circuit, and the earphone recognition method further includes: receiving a sound channel switching signal from the terminal through the audio control circuit to switch the sound channels in the earphone receiver.

In the technical solution, the earphone includes the piezoelectric film sensor, the audio control circuit is arranged on the piezoelectric film sensor, and is used for receiving the earphone switching signal from the terminal and automatically switching the sound channels in the earphone after receiving the earphone switching signal, namely exchanging the sound channel in a left receiver with the sound channel in a right receiver, so that when the user wears the earphone conversely, the user can also hear correct high-quality sound without re-wearing the earphone, which is beneficial for the auditory experience of the user.

In the above technical solution, preferably, the earphone recognition method further includes: receiving a prompting signal from the terminal through the audio control circuit to prompt the user to re-wear the earphone.

In the technical solution, if the earphone worn by the user is directed to the human ear structure, when the user does not correctly wear the earphone, the earphone cannot automatically switch the sound channels, at this time, the audio control circuit can prompt the user in a sound or vibration manner, so that when the user does not correctly wear the earphone, the user can re-wear the earphone as soon as possible.

In the above technical solution, preferably, the piezoelectric film sensor further includes a signal processing circuit, the earphone further includes a piezoelectric signal processor, and the acquisition step specifically includes: acquiring a pressure signal on the earphone receiver through the signal processing circuit, and converting the pressure signal into a level signal; and sampling, quantifying and encoding the level signal by the piezoelectric signal processor to acquire a spectrum signal, and using the spectrum signal as the left and/or right ear structure information.

In the technical solution, the left and/or right ear structure information is the spectrum signal corresponding to the human ear structure, the spectrum signal is a discrete spectrum signal and is a data signal after sampling, quantifying and encoding, compared with the situation that the structure information is an analog signal, the terminal can more easily and more accurately determine whether the structure information matches the structure information of the corresponding ear collected when the user correctly wears the earphone for the first time, namely, the terminal can more accurately and more conveniently determine whether the user correctly wears the earphone.

In another aspect of the present invention, an earphone recognition apparatus is provided, including: an acquisition unit used for, when a user wears the earphone, acquiring left and/or right ear structure information, collected by the earphone, of the user; and a sending unit, used for sending the left and/or right ear structure information to a terminal, so that the terminal determines whether the user correctly wears the earphone according to whether the left and/or right ear structure information matches left and/or right ear structure information acquired when the user correctly wears the earphone for the first time.

In the technical solution, when the user wears the earphone, the structure information of at least one of the left ear and the right ear collected by the earphone worn by the user is acquired, and the collected structure information is sent to the terminal, so that the terminal can compare the structure information with the structure information of the corresponding ear collected when the user correctly wears the earphone for the first time, and can determine whether the user wears the earphone conversely according to a comparison result, namely, when the structure information does not match the structure information of the corresponding ear collected when the user correctly wears the earphone for the first time, it indicates that the user wears the earphone conversely, and on the contrary, the user has correctly worn the earphone.

Wherein, the left and/or right ear structure information can be audio or video information reflecting a human ear structure.

In the above technical solution, preferably, the earphone includes a piezoelectric film sensor, the piezoelectric film sensor includes an audio control circuit, and the earphone recognition apparatus further includes: a receiving unit, used for receiving a sound channel switching signal from the terminal through the audio control circuit to switch the sound channels in the earphone receiver.

In the technical solution, the earphone includes the piezoelectric film sensor, the audio control circuit is arranged on the piezoelectric film sensor, and is used for receiving the earphone switching signal from the terminal and automatically switching the sound channels in the earphone after receiving the earphone switching signal, namely exchanging the sound channel in a left receiver with the sound channel in a right receiver, so that when the user wears the earphone conversely, the user can also hear correct high-quality sound without re-wearing the earphone, which is beneficial for the auditory experience of the user.

In the above technical solution, preferably, the receiving unit is further used for receiving a prompting signal from the terminal through the audio control circuit to prompt the user to re-wear the earphone.

In the technical solution, if the earphone worn by the user is directed to the human ear structure, when the user does not correctly wear the earphone, the earphone cannot automatically switch the sound channels, at this time, the audio control circuit can prompt the user in a sound or vibration manner, so that when the user does not correctly wear the earphone, the user can re-wear the earphone as soon as possible.

In the above technical solution, preferably, the piezoelectric film sensor further includes a signal processing circuit, the earphone further includes a piezoelectric signal processor, and the acquisition unit is specifically used for: acquiring a pressure signal on the earphone receiver through the signal processing circuit, and converting the pressure signal into a level signal; and sampling, quantifying and encoding the level signal by the piezoelectric signal processor to acquire a spectrum signal, and using the spectrum signal as the left and/or right ear structure information.

In the technical solution, the left and/or right ear structure information is the spectrum signal corresponding to the human ear structure, the spectrum signal is a discrete spectrum signal and is a data signal after sampling, quantifying and encoding, compared with the situation that the structure information is an analog signal, the terminal can more easily and more accurately determine whether the structure information matches the structure information of the corresponding ear collected when the user correctly wears the earphone for the first time, namely, the terminal can more accurately and more conveniently determine whether the user correctly wears the earphone.

In a third aspect of the present invention, an earphone control method is provided, including: a receiving step: receiving left and/or right ear structure information of a user from the earphone; a determining step: determining whether the user correctly wears the earphone according to whether the received left and/or right ear structure information matches left and/or right ear structure information received when the user correctly wears the earphone for the first time; and a sending step: sending a control instruction to the earphone when the determination result is that the user does not correctly wear the earphone, thus allowing the earphone to execute a corresponding operation according to the control instruction.

In the technical solution, the structure information of at least one of the left ear and the right ear collected by the earphone worn by the user is received, so that the terminal can compare the structure information with the structure information of the corresponding ear collected when the user correctly wears the earphone for the first time, and determine whether the user wears the earphone conversely according to a comparison result (namely, when the structure information does not match the structure information of the corresponding ear collected when the user correctly wears the earphone for the first time, it indicates that the user wears the earphone conversely, and on the contrary, the user has correctly worn the earphone), and when determining that the user wears the earphone conversely, the terminal sends the control instruction to the earphone to allow the earphone to execute the corresponding operation, so as to guarantee very good user experience in the case that the user wears the earphone conversely.

Wherein, the left and/or right ear structure information can be audio or video information reflecting a human ear structure.

In the above technical solution, preferably, sending a sound channel switching signal to an audio control circuit in the earphone when the determination result is that the user does not correctly wear the earphone, thus allowing the audio control circuit to switch the sound channels in the earphone receiver.

In the technical solution, since the earphone switching signal is sent to the audio control circuit, the earphone can automatically switch the sound channels in the earphone according to the switching signal, namely exchange the sound channel in a left receiver with the sound channel in a right receiver, so that when the user wears the earphone conversely, the user can also hear correct high-quality sound without re-wearing the earphone, which is beneficial for the auditory experience of the user.

In the above technical solution, preferably, the sending step further specifically includes: sending a prompting signal to the audio control circuit in the earphone to prompt the user to re-wear the earphone when the determination result is that the user does not correctly wear the earphone.

In the technical solution, if the earphone worn by the user is directed to the human ear structure, when the user does not correctly wear the earphone, the earphone cannot automatically switch the sound channels, at this time, when determining that the user wears the earphone conversely, the prompting signal can be sent to the audio control circuit to allow the audio control circuit to prompt the user in a sound or vibration manner, and then the user can re-wear the earphone as soon as possible.

In the above technical solution, preferably, the determining step specifically includes: determining whether the user correctly wears the earphone according to whether the similarity of a received left and/or right ear spectrum signal, sent by the earphone, of the user with the left and/or right ear spectrum signal received when the user correctly wears the earphone for the first time is larger than or equal to preset similarity; and determining that the user does not correctly wear the earphone when the similarity is larger than or equal to the preset similarity, and determining that the user correctly wears the earphone when the similarity is smaller than the preset similarity.

In the technical solution, since the received spectrum signal cannot be completely overlapped with the spectrum signal of the corresponding ear collected when the user correctly wears the earphone for the first time, by comparing the relation of the similarity of the two successive spectrum signals with the preset similarity, whether the user correctly wears the earphone can be accurately determined. For example, when the similarity of the two spectrums is higher than 90%, it is deemed that the spectrum signal collected at present is the same as the spectrum signal of the corresponding ear collected when the user correctly wears the earphone for the first time, and then it can be determined that the user has correctly worn the earphone; and on the contrary, it indicates that the user has worn the earphone conversely.

In a fourth aspect of the present invention, an earphone control apparatus, applied to a terminal, is provided, including: a receiving unit, used for receiving left and/or right ear structure information of a user from the earphone; a determining unit, used for determining whether the user correctly wears the earphone according to whether the received left and/or right ear structure information matches left and/or right ear structure information received when the user correctly wears the earphone for the first time; and a sending unit used for, when the determination result is that the user does not correctly wear the earphone, sending a control instruction to the earphone, thus allowing the earphone to execute a corresponding operation according to the control instruction.

In the technical solution, the structure information of at least one of the left ear and the right ear collected by the earphone worn by the user is received, so that the terminal can compare the structure information with the structure information of the corresponding ear collected when the user correctly wears the earphone for the first time, and determine whether the user wears the earphone conversely according to a comparison result (namely, when the structure information does not match the structure information of the corresponding ear collected when the user correctly wears the earphone for the first time, it indicates that the user wears the earphone conversely, and on the contrary, the user has correctly worn the earphone), and when determining that the user wears the earphone conversely, the terminal sends the control instruction to the earphone to allow the earphone to execute the corresponding operation, so as to guarantee very good user experience in the case that the user wears the earphone conversely.

Wherein, the left and/or right ear structure information can be audio or video information reflecting a human ear structure.

In the above technical solution, preferably, the sending unit is specifically used for: when the determination result is that the user does not correctly wear the earphone, sending a sound channel switching signal to an audio control circuit in the earphone, thus allowing the audio control circuit to switch the sound channels in the earphone receiver.

In the technical solution, since the earphone switching signal is sent to the audio control circuit, the earphone can automatically switch the sound channels in the earphone according to the switching signal, namely exchange the sound channel in a left receiver with the sound channel in a right receiver, so that when the user wears the earphone conversely, the user can also hear correct high-quality sound without re-wearing the earphone, which is beneficial for the auditory experience of the user.

In the above technical solution, preferably, the sending unit is further specifically used for: when the determination result is that the user does not correctly wear the earphone, sending a prompting signal to the audio control circuit in the earphone to prompt the user to re-wear the earphone.

In the technical solution, if the earphone worn by the user is directed to the human ear structure, when the user does not correctly wear the earphone, the earphone cannot automatically switch the sound channels, at this time, when determining that the user wears the earphone conversely, the prompting signal can be sent to the audio control circuit to allow the audio control circuit to prompt the user in a sound or vibration manner, and then the user can re-wear the earphone as soon as possible.

In the above technical solution, preferably, the determining unit is specifically used for: determining whether the user correctly wears the earphone according to whether the similarity of a received left and/or right ear spectrum signal, sent by the earphone, of the user with the left and/or right ear spectrum signal received when the user correctly wears the earphone for the first time is larger than or equal to preset similarity; and when the similarity is larger than or equal to the preset similarity, determining that the user does not correctly wear the earphone, and when the similarity is smaller than the preset similarity, determining that the user correctly wears the earphone.

In the technical solution, since the received spectrum signal cannot be completely overlapped with the spectrum signal of the corresponding ear collected when the user correctly wears the earphone for the first time, by comparing the relation of the similarity of the two successive spectrum signals with the preset similarity, whether the user correctly wears the earphone can be accurately determined. For example, when the similarity of the two spectrums is higher than 90%, it is deemed that the spectrum signal collected at present is the same as the spectrum signal of the corresponding ear collected when the user correctly wears the earphone for the first time, and then it can be determined that the user has correctly worn the earphone; and on the contrary, it indicates that the user has worn the earphone conversely.

In a fifth aspect of the present invention, an earphone is provided, including: a piezoelectric film sensor arranged on a receiver of the earphone and connected with a control line in the earphone, wherein the piezoelectric film sensor specifically includes: a signal processing circuit used for, when a user wears the earphone, acquiring left and/or right ear structure information, collected by the earphone, of the user, and sending the left and/or right ear structure information to a comparator; the comparator connected with the signal processing circuit and used for determining whether the user correctly wears the earphone according to whether the left and/or right ear structure information matches left and/or right ear structure information acquired by the signal processing circuit when the user correctly wears the earphone for the first time, and sending a control signal to the signal processing circuit when determining that the user does not correctly wear the earphone; and an audio control circuit connected with the signal processing circuit and used for receiving the control signal from the signal processing circuit through the control line and executing a corresponding operation according to the control signal.

In the technical solution, when the comparator in the earphone determines that the structure information of at least one ear of the user collected by the signal processing circuit does not match the structure information of the corresponding ear collected when the user correctly wears the earphone for the first time, the comparator determines that the user wears the earphone conversely, at this time, the comparator will send the control signal to the audio control circuit to allow the audio control circuit to execute a corresponding action according to the control signal, for example, generating a prompt tone to prompt that the user wears the earphone conversely, or automatically switching the sound channels in the earphone, and thus, in the case that the user wears the earphone conversely, the user experience is still very good.

Wherein, the left and/or right ear structure information can be audio or video information reflecting a human ear structure.

In the above technical solution, preferably, the signal processing circuit is specifically used for: acquiring a pressure signal of the left and/or right ear of the user on the earphone when the user correctly wears the earphone, converting the pressure signal into a level signal, and using the level signal as the left and/or right ear structure information.

In the technical solution, the signal processing circuit collects the pressure signal generated by the left and/or right ear of the user on the earphone and converts the pressure signal into the corresponding level signal, so as to use the level signal as the left and/or right ear structure information, so that the earphone determines whether the user wears the earphone conversely according to whether the level signals (the user correctly wears the earphone for the first time) when the user successively wears the earphone twice match.

In the above technical solution, preferably, the earphone further includes: a piezoelectric signal processor arranged in a volume control circuit in the earphone and used for sampling, quantifying and encoding the level signal to acquire a spectrum signal, and using the spectrum signal as the left and/or right ear structure information.

In the technical solution, the piezoelectric signal processor samples, quantifies and encodes a continuous level signal to obtain a discrete spectrum signal, the discrete spectrum signal is used as the structure information, compared with the situation that the structure information is an analog signal, the earphone can more easily and more accurately determine whether the structure information matches the structure information of the corresponding ear collected when the user correctly wears the earphone for the first time, namely, the earphone can more accurately and more conveniently determine whether the user correctly wears the earphone.

In the above technical solution, preferably, the piezoelectric film sensor is an annular sensor group.

In the technical solution, since the structure differences of different positions of human ears are little and are very difficult to detect, but these tiny differences are converted into electric signals and then are stored by the annular sensor group, so the structure information of external auditory canals can be sufficiently collected.

In a sixth aspect of the present invention, an earphone recognition method is provided, including: an acquisition step: when a user wears the earphone, acquiring left and/or right ear structure information, collected by the earphone, of the user; and a determining step: determining whether the user correctly wears the earphone according to whether the left and/or right ear structure information matches left and/or right ear structure information acquired when the user correctly wears the earphone for the first time.

In the technical solution, when the user wears the earphone, the structure information of at least one of the left ear and the right ear collected by the earphone worn by the user is acquired, so that the earphone can compare the structure information with the structure information of the corresponding ear collected when the user correctly wears the earphone for the first time, and can determine whether the user wears the earphone conversely according to a comparison result, namely, when the structure information does not match the structure information of the corresponding ear collected when the user correctly wears the earphone for the first time, it indicates that the user wears the earphone conversely, and on the contrary, the user has correctly worn the earphone.

Wherein, the left and/or right ear structure information can be audio or video information reflecting a human ear structure.

In the above technical solution, preferably, the earphone includes a piezoelectric film sensor, the piezoelectric film sensor includes a signal processing circuit and an audio control circuit, and the recognition method further includes: when the user does not correctly wear the earphone, sending a sound channel switching signal to the audio control circuit by the signal processing circuit to allow the audio control circuit to switch the sound channels in the earphone receiver.

In the technical solution, the earphone includes the piezoelectric film sensor, the audio control circuit is arranged on the piezoelectric film sensor, and is used for receiving the earphone switching signal and automatically switching the sound channels in the earphone after receiving the earphone switching signal, namely exchanging the sound channel in a left receiver with the sound channel in a right receiver, so that when the user wears the earphone conversely, the user can also hear correct high-quality sound without re-wearing the earphone, which is beneficial for the auditory experience of the user.

In the above technical solution, preferably, the earphone recognition method further includes: when the user does not correctly wear the earphone, sending a prompting signal to the audio control circuit by the signal processing circuit to prompt the user to re-wear the earphone.

In the technical solution, if the earphone worn by the user is directed to the human ear structure, when the user does not correctly wear the earphone, the earphone cannot automatically switch the sound channels, at this time, the audio control circuit can prompt the user according to the received prompting signal in a sound or vibration manner, so that when the user does not correctly wear the earphone, the user can re-wear the earphone as soon as possible.

In the above technical solution, preferably, the earphone further includes a piezoelectric signal processor, and the acquisition step specifically includes: when the user wears the earphone, acquiring a pressure signal on the earphone receiver through the signal processing circuit, and converting the pressure signal into a level signal; and sampling, quantifying and encoding the level signal by the piezoelectric signal processor to acquire a spectrum signal, and using the spectrum signal as the left and/or right ear structure information.

In the technical solution, the left and/or right ear structure information is the spectrum signal corresponding to the human ear structure, the spectrum signal is a discrete spectrum signal and is a data signal after sampling, quantifying and encoding, compared with the situation that the structure information is an analog signal, the earphone can more easily and more accurately determine whether the structure information matches the structure information of the corresponding ear collected when the user correctly wears the earphone for the first time, namely, the earphone can more accurately and more conveniently determine whether the user correctly wears the earphone.

In the above technical solution, preferably, the piezoelectric film sensor further includes a comparator, and the determining step specifically includes: when the user wears the earphone, determining, by the comparator, whether the user correctly wears the earphone according to whether the similarity of a received left and/or right ear spectrum signal collected by the piezoelectric film sensor with the left and/or right ear spectrum signal collected by the piezoelectric film sensor when the user correctly wears the earphone for the first time is larger than or equal to preset similarity; and determining that the user does not correctly wear the earphone when the similarity is larger than or equal to the preset similarity, and determining that the user correctly wears the earphone when the similarity is smaller than the preset similarity.

In the technical solution, since the received spectrum signal cannot be completely overlapped with the spectrum signal of the corresponding ear received when the user correctly wears the earphone for the first time, by comparing the relation of the similarity of the two successive spectrum signals with the preset similarity, the comparator can accurately determine whether the user correctly wears the earphone. For example, when the similarity of the two spectrums is higher than 90%, it is deemed that the spectrum signal collected at present is the same as the spectrum signal of the corresponding ear collected when the user correctly wears the earphone for the first time, and then it can be determined that the user has correctly worn the earphone; and on the contrary, it indicates that the user has worn the earphone conversely.

In a seventh aspect of the present invention, an earphone recognition apparatus is provided, including: a piezoelectric film sensor, and the piezoelectric film sensor includes: an acquisition unit, used for, when a user wears the earphone, acquiring left and/or right ear structure information, collected by the earphone, of the user; and a determining unit, used for determining whether the user correctly wears the earphone according to whether the left and/or right ear structure information matches left and/or right ear structure information acquired when the user correctly wears the earphone for the first time.

In the technical solution, when the user wears the earphone, the structure information of at least one of the left ear and the right ear collected by the earphone worn by the user is acquired, so that the earphone can compare the structure information with the structure information of the corresponding ear collected when the user correctly wears the earphone for the first time, and can determine whether the user wears the earphone conversely according to a comparison result, namely, when the structure information does not match the structure information of the corresponding ear collected when the user correctly wears the earphone for the first time, it indicates that the user wears the earphone conversely, and on the contrary, the user has correctly worn the earphone.

Wherein, the left and/or right ear structure information can be audio or video information reflecting a human ear structure.

In the above technical solution, preferably, the piezoelectric film sensor includes a signal processing circuit and an audio control circuit, and the recognition apparatus further includes: a control unit used for, when the user does not correctly wear the earphone, controlling the signal processing circuit to send a sound channel switching signal to the audio control circuit to allow the audio control circuit to switch the sound channels in the earphone receiver.

In the technical solution, the earphone includes the piezoelectric film sensor, the audio control circuit is arranged on the piezoelectric film sensor, and is used for receiving the earphone switching signal and automatically switching the sound channels in the earphone after receiving the earphone switching signal, namely exchanging the sound channel in a left receiver with the sound channel in a right receiver, so that when the user wears the earphone conversely, the user can also hear correct high-quality sound without re-wearing the earphone, which is beneficial for the auditory experience of the user.

In the above technical solution, preferably, the control unit is further used for: when the user does not correctly wear the earphone, controlling the signal processing circuit to send a prompting signal to the audio control circuit to prompt the user to re-wear the earphone.

In the technical solution, if the earphone worn by the user is directed to the human ear structure, when the user does not correctly wear the earphone, the earphone cannot automatically switch the sound channels, at this time, the audio control circuit can prompt the user according to the received prompting signal in a sound or vibration manner, so that when the user does not correctly wear the earphone, the user can re-wear the earphone as soon as possible.

In the above technical solution, preferably, the earphone recognition apparatus further includes a piezoelectric signal processor, and the acquisition unit is specifically used for: when the user wears the earphone, acquiring a pressure signal on the earphone receiver, converting the pressure signal into a level signal, sampling, quantifying and encoding the level signal by the piezoelectric signal processor to acquire a spectrum signal, and using the spectrum signal as the left and/or right ear structure information.

In the technical solution, the left and/or right ear structure information is the spectrum signal corresponding to the human ear structure, the spectrum signal is a discrete spectrum signal and is a data signal after sampling, quantifying and encoding, compared with the situation that the structure information is an analog signal, the earphone can more easily and more accurately determine whether the structure information matches the structure information of the corresponding ear collected when the user correctly wears the earphone for the first time, namely, the earphone can more accurately and more conveniently determine whether the user correctly wears the earphone.

In the above technical solution, preferably, the determining unit is a comparator, and the comparator is specifically used for: when the user wears the earphone, determining whether the user correctly wears the earphone according to whether the similarity of an acquired left and/or right ear spectrum signal with the left and/or right ear spectrum signal acquired when the user correctly wears the earphone for the first time is larger than or equal to preset similarity, and when the similarity is larger than or equal to the preset similarity, determining that the user does not correctly wear the earphone, and when the similarity is smaller than the preset similarity, determining that the user correctly wears the earphone.

In the technical solution, since the received spectrum signal cannot be completely overlapped with the spectrum signal of the corresponding ear received when the user correctly wears the earphone for the first time, by comparing the relation of the similarity of the two successive spectrum signals with the preset similarity, the comparator can accurately determine whether the user correctly wears the earphone. For example, when the similarity of the two spectrums is higher than 90%, it is deemed that the spectrum signal collected at present is the same as the spectrum signal of the corresponding ear collected when the user correctly wears the earphone for the first time, and then it can be determined that the user has correctly worn the earphone; and on the contrary, it indicates that the user has worn the earphone conversely.

By means of the solutions of the present invention, when the user wears the earphone conversely, the user can still hear proper high-quality sound, and further, the listening experience of the user is improved.

DETAILED DESCRIPTION OF THE EMBODIMENTS

In order to understand the above objects, features and advantages of the present invention more clearly, a further detailed description of the present invention will be given below in combination with the accompany drawings and embodiments. It should be noted that, the embodiments of the present application and the features in the embodiments can be combined with each other as long as no conflict is generated.

A lot of specific details are described in the following description to fully understand the present invention, but the present invention can also be implemented in other manners different from what is described herein, and thus the protection scope of the present invention is not limited by the specific embodiments disclosed below.

Figure 1:
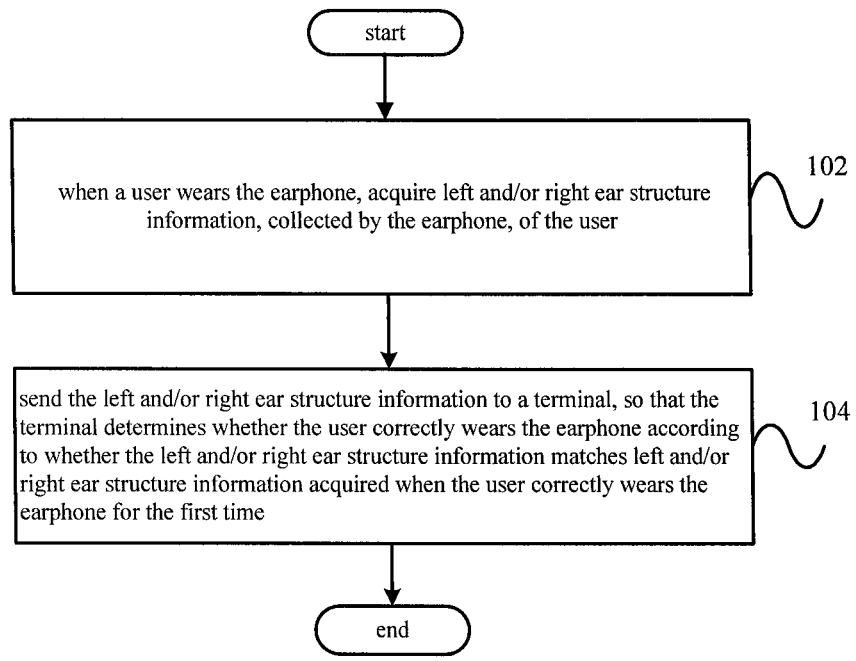
FIG. 1 shows a schematic diagram of a flow of an earphone recognition method according to an embodiment of the present invention.

FIG. 1 shows a schematic diagram of a flow of an earphone recognition method according to an embodiment of the present invention.

As shown in FIG. 1, the earphone recognition method according to the embodiment of the present invention includes: an acquisition step 102: when a user wears the earphone, acquiring left and/or right ear structure information, collected by the earphone, of the user; and a sending step 104: sending the left and/or right ear structure information to a terminal, so that the terminal determines whether the user correctly wears the earphone according to whether the left and/or right ear structure information matches left and/or right ear structure information acquired when the user correctly wears the earphone for the first time.

In the technical solution, when the user wears the earphone, the structure information of at least one of the left ear and the right ear collected by the earphone worn by the user is acquired, and the collected structure information is sent to the terminal, so that the terminal can compare the structure information with the structure information of the corresponding ear collected when the user correctly wears the earphone for the first time, and can determine whether the user wears the earphone conversely according to a comparison result, namely, when the structure information does not match the structure information of the corresponding ear collected when the user correctly wears the earphone for the first time, it indicates that the user wears the earphone conversely, and on the contrary, the user has correctly worn the earphone.

Wherein, the left and/or right ear structure information can be audio or video information reflecting a human ear structure.

In the above technical solution, preferably, the earphone includes a piezoelectric film sensor, the piezoelectric film sensor includes an audio control circuit, and the earphone recognition method further includes: receiving a sound channel switching signal from the terminal through the audio control circuit to switch the sound channels in the earphone receiver.

In the technical solution, the earphone includes the piezoelectric film sensor, the audio control circuit is arranged on the piezoelectric film sensor, and is used for receiving the earphone switching signal from the terminal and automatically switching the sound channels in the earphone after receiving the earphone switching signal, namely exchanging the sound channel in a left receiver with the sound channel in a right receiver, so that when the user wears the earphone conversely, the user can also hear correct high-quality sound without re-wearing the earphone, which is beneficial for the auditory experience of the user.

In the above technical solution, preferably, the earphone recognition method further includes: receiving a prompting signal from the terminal through the audio control circuit to prompt the user to re-wear the earphone.

In the technical solution, if the earphone worn by the user is directed to the human ear structure, when the user does not correctly wear the earphone, the earphone cannot automatically switch the sound channels, at this time, the audio control circuit can prompt the user in a sound or vibration manner, so that when the user does not correctly wear the earphone, the user can re-wear the earphone as soon as possible.

In the above technical solution, preferably, the piezoelectric film sensor further includes a signal processing circuit, the earphone further includes a piezoelectric signal processor, and the acquisition step specifically includes: acquiring a pressure signal on the earphone receiver through the signal processing circuit, and converting the pressure signal into a level signal; and sampling, quantifying and encoding the level signal by the piezoelectric signal processor to acquire a spectrum signal, and using the spectrum signal as the left and/or right ear structure information.

In the technical solution, the left and/or right ear structure information is the spectrum signal corresponding to the human ear structure, the spectrum signal is a discrete spectrum signal and is a data signal after sampling, quantifying and encoding, compared with the situation that the structure information is an analog signal, the terminal can more easily and more accurately determine whether the structure information matches the structure information of the corresponding ear collected when the user correctly wears the earphone for the first time, namely, the terminal can more accurately and more conveniently determine whether the user correctly wears the earphone.

Figure 2:
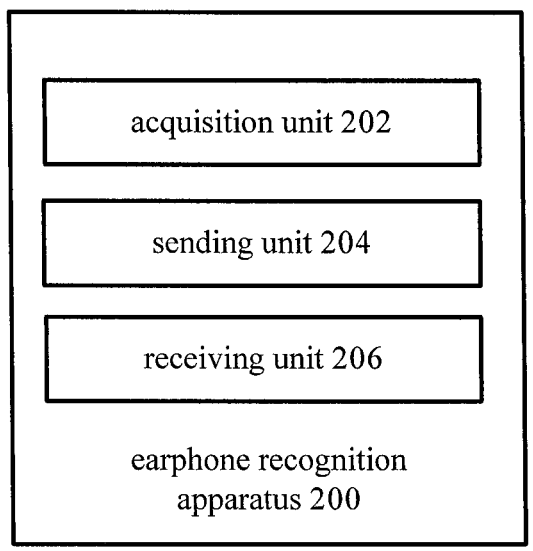
FIG. 2 shows a schematic diagram of a structure of an earphone recognition apparatus according to an embodiment of the present invention.

FIG. 2 shows a schematic diagram of a structure of an earphone recognition apparatus according to an embodiment of the present invention.

As shown in FIG. 2, the earphone recognition apparatus according to the embodiment of the present invention includes: an acquisition unit 202 used for, when a user wears the earphone, acquiring left and/or right ear structure information, collected by the earphone, of the user; and a sending unit 204, used for sending the left and/or right ear structure information to a terminal, so that the terminal determines whether the user correctly wears the earphone according to whether the left and/or right ear structure information matches left and/or right ear structure information acquired when the user correctly wears the earphone for the first time.

In the technical solution, when the user wears the earphone, the structure information of at least one of the left ear and the right ear collected by the earphone worn by the user is acquired, and the collected structure information is sent to the terminal, so that the terminal can compare the structure information with the structure information of the corresponding ear collected when the user correctly wears the earphone for the first time, and can determine whether the user wears the earphone conversely according to a comparison result, namely, when the structure information does not match the structure information of the corresponding ear collected when the user correctly wears the earphone for the first time, it indicates that the user wears the earphone conversely, and on the contrary, the user has correctly worn the earphone.

Wherein, the left and/or right ear structure information can be audio or video information reflecting a human ear structure.

In the above technical solution, preferably, the earphone includes a piezoelectric film sensor, the piezoelectric film sensor includes an audio control circuit, and the earphone recognition apparatus further includes: a receiving unit 206, used for receiving a sound channel switching signal from the terminal through the audio control circuit to switch the sound channels in the earphone receiver.

In the technical solution, the earphone includes the piezoelectric film sensor, the audio control circuit is arranged on the piezoelectric film sensor, and is used for receiving the earphone switching signal from the terminal and automatically switching the sound channels in the earphone after receiving the earphone switching signal, namely exchanging the sound channel in a left receiver with the sound channel in a right receiver, so that when the user wears the earphone conversely, the user can also hear correct high-quality sound without re-wearing the earphone, which is beneficial for the auditory experience of the user.

In the above technical solution, preferably, the receiving unit 206 is further used for receiving a prompting signal from the terminal through the audio control circuit to prompt the user to re-wear the earphone.

In the technical solution, if the earphone worn by the user is directed to the human ear structure, when the user does not correctly wear the earphone, the earphone cannot automatically switch the sound channels, at this time, the audio control circuit can prompt the user in a sound or vibration manner, so that when the user does not correctly wear the earphone, the user can re-wear the earphone as soon as possible.

In the above technical solution, preferably, the piezoelectric film sensor further includes a signal processing circuit, the earphone further includes a piezoelectric signal processor, and the acquisition unit 202 is specifically used for: acquiring a pressure signal on the earphone receiver through the signal processing circuit, and converting the pressure signal into a level signal; and sampling, quantifying and encoding the level signal by the piezoelectric signal processor to acquire a spectrum signal, and using the spectrum signal as the left and/or right ear structure information.

In the technical solution, the left and/or right ear structure information is the spectrum signal corresponding to the human ear structure, the spectrum signal is a discrete spectrum signal and is a data signal after sampling, quantifying and encoding, compared with the situation that the structure information is an analog signal, the terminal can more easily and more accurately determine whether the structure information matches the structure information of the corresponding ear collected when the user correctly wears the earphone for the first time, namely, the terminal can more accurately and more conveniently determine whether the user correctly wears the earphone.

Figure 3:
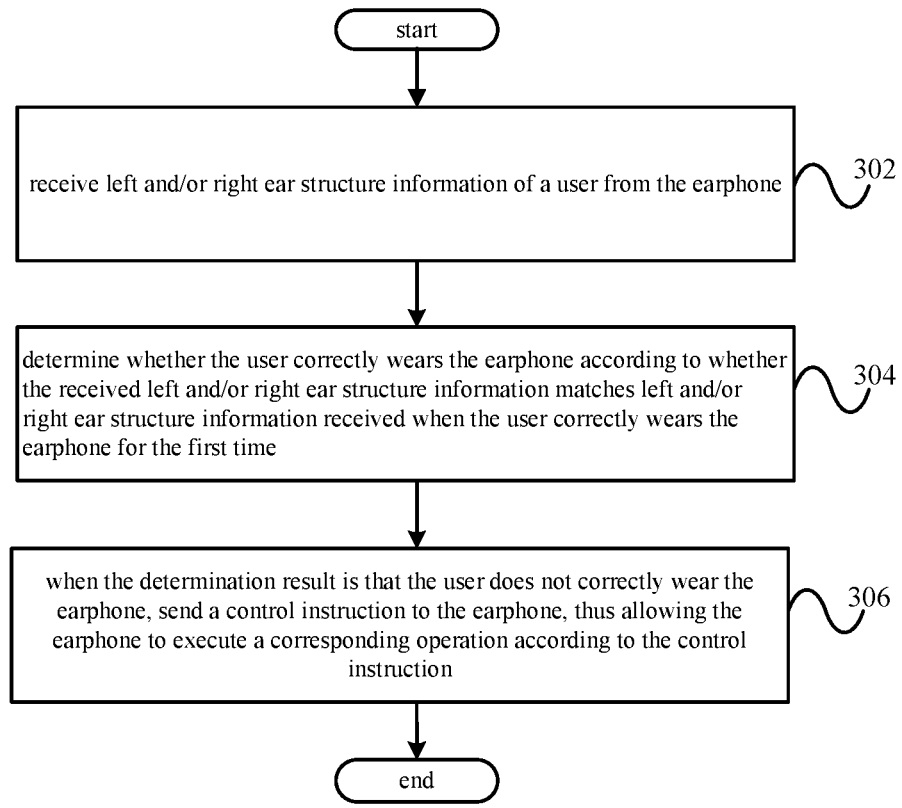
FIG. 3 shows a schematic diagram of a flow of an earphone control method according to an embodiment of the present invention.

FIG. 3 shows a schematic diagram of a flow of an earphone control method according to an embodiment of the present invention.

As shown in FIG. 3, the earphone control method according to the embodiment of the present invention includes: a receiving step 302: receiving left and/or right ear structure information of a user from the earphone; a determining step 304: determining whether the user correctly wears the earphone according to whether the received left and/or right ear structure information matches left and/or right ear structure information received when the user correctly wears the earphone for the first time; and a sending step 306: sending a control instruction to the earphone when the determination result is that the user does not correctly wear the earphone, thus allowing the earphone to execute a corresponding operation according to the control instruction.

In the technical solution, the structure information of at least one of the left ear and the right ear collected by the earphone worn by the user is received, so that the terminal can compare the structure information with the structure information of the corresponding ear collected when the user correctly wears the earphone for the first time, and determine whether the user wears the earphone conversely according to a comparison result (namely, when the structure information does not match the structure information of the corresponding ear collected when the user correctly wears the earphone for the first time, it indicates that the user wears the earphone conversely, and on the contrary, the user has correctly worn the earphone), and when determining that the user wears the earphone conversely, the terminal sends the control instruction to the earphone to allow the earphone to execute the corresponding operation, so as to guarantee very good user experience in the case that the user wears the earphone conversely.

Wherein, the left and/or right ear structure information can be audio or video information reflecting a human ear structure.

In the above technical solution, preferably, sending a sound channel switching signal to an audio control circuit in the earphone when the determination result is that the user does not correctly wear the earphone, thus allowing the audio control circuit to switch the sound channels in the earphone receiver.

In the technical solution, since the earphone switching signal is sent to the audio control circuit, the earphone can automatically switch the sound channels in the earphone according to the switching signal, namely exchange the sound channel in a left receiver with the sound channel in a right receiver, so that when the user wears the earphone conversely, the user can also hear correct high-quality sound without re-wearing the earphone, which is beneficial for the auditory experience of the user.

In the above technical solution, preferably, the sending step further specifically includes: sending a prompting signal to the audio control circuit in the earphone to prompt the user to re-wear the earphone when the determination result is that the user does not correctly wear the earphone.

In the technical solution, if the earphone worn by the user is directed to the human ear structure, when the user does not correctly wear the earphone, the earphone cannot automatically switch the sound channels, at this time, when determining that the user wears the earphone conversely, the prompting signal can be sent to the audio control circuit to allow the audio control circuit to prompt the user in a sound or vibration manner, and then the user can re-wear the earphone as soon as possible.

In the above technical solution, preferably, the determining step specifically includes: determining whether the user correctly wears the earphone according to whether the similarity of a received left and/or right ear spectrum signal, sent by the earphone, of the user with the left and/or right ear spectrum signal received when the user correctly wears the earphone for the first time is larger than or equal to preset similarity; and determining that the user does not correctly wear the earphone when the similarity is larger than or equal to the preset similarity, and determining that the user correctly wears the earphone when the similarity is smaller than the preset similarity.

In the technical solution, since the received spectrum signal cannot be completely overlapped with the spectrum signal of the corresponding ear collected when the user correctly wears the earphone for the first time, by comparing the relation of the similarity of the two successive spectrum signals with the preset similarity, whether the user correctly wears the earphone can be accurately determined. For example, when the similarity of the two spectrums is higher than 90%, it is deemed that the spectrum signal collected at present is the same as the spectrum signal of the corresponding ear collected when the user correctly wears the earphone for the first time, and then it can be determined that the user has correctly worn the earphone; and on the contrary, it indicates that the user has worn the earphone conversely.

Figure 4:
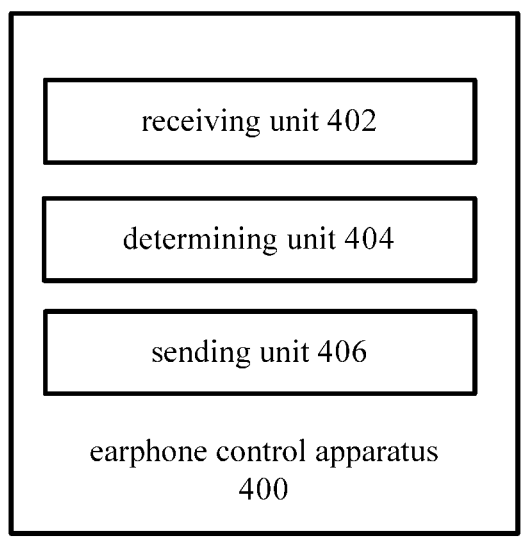
FIG. 4 shows a schematic diagram of a structure of an earphone control apparatus according to an embodiment of the present invention.

FIG. 4 shows a schematic diagram of a structure of an earphone control apparatus according to an embodiment of the present invention.

As shown in FIG. 4, the earphone control apparatus 400 according to the embodiment of the present invention includes: a receiving unit 402, used for receiving left and/or right ear structure information of a user from the earphone; a determining unit 404, used for determining whether the user correctly wears the earphone according to whether the received left and/or right ear structure information matches left and/or right ear structure information received when the user correctly wears the earphone for the first time; and a sending unit 406 used for, when the determination result is that the user does not correctly wear the earphone, sending a control instruction to the earphone, thus allowing the earphone to execute a corresponding operation according to the control instruction.

In the technical solution, the structure information of at least one of the left ear and the right ear collected by the earphone worn by the user is received, so that the terminal can compare the structure information with the structure information of the corresponding ear collected when the user correctly wears the earphone for the first time, and determine whether the user wears the earphone conversely according to a comparison result (namely, when the structure information does not match the structure information of the corresponding ear collected when the user correctly wears the earphone for the first time, it indicates that the user wears the earphone conversely, and on the contrary, the user has correctly worn the earphone), and when determining that the user wears the earphone conversely, the terminal sends the control instruction to the earphone to allow the earphone to execute the corresponding operation, so as to guarantee very good user experience in the case that the user wears the earphone conversely.

Wherein, the left and/or right ear structure information can be audio or video information reflecting a human ear structure.

In the above technical solution, preferably, the sending unit 406 is specifically used for: when the determination result is that the user does not correctly wear the earphone, sending a sound channel switching signal to an audio control circuit in the earphone, thus allowing the audio control circuit to switch the sound channels in the earphone receiver.

In the technical solution, since the earphone switching signal is sent to the audio control circuit, the earphone can automatically switch the sound channels in the earphone according to the switching signal, namely exchange the sound channel in a left receiver with the sound channel in a right receiver, so that when the user wears the earphone conversely, the user can also hear correct high-quality sound without re-wearing the earphone, which is beneficial for the auditory experience of the user.

In the above technical solution, preferably, the sending unit 406 is further specifically used for: when the determination result is that the user does not correctly wear the earphone, sending a prompting signal to the audio control circuit in the earphone to prompt the user to re-wear the earphone.

In the technical solution, if the earphone worn by the user is directed to the human ear structure, when the user does not correctly wear the earphone, the earphone cannot automatically switch the sound channels, at this time, when determining that the user wears the earphone conversely, the prompting signal can be sent to the audio control circuit to allow the audio control circuit to prompt the user in a sound or vibration manner, and then the user can re-wear the earphone as soon as possible.

In the above technical solution, preferably, the determining unit 404 is specifically used for: determining whether the user correctly wears the earphone according to whether the similarity of a received left and/or right ear spectrum signal, sent by the earphone, of the user with the left and/or right ear spectrum signal received when the user correctly wears the earphone for the first time is larger than or equal to preset similarity; and when the similarity is larger than or equal to the preset similarity, determining that the user does not correctly wear the earphone, and when the similarity is smaller than the preset similarity, determining that the user correctly wears the earphone.

In the technical solution, since the received spectrum signal cannot be completely overlapped with the spectrum signal of the corresponding ear collected when the user correctly wears the earphone for the first time, by comparing the relation of the similarity of the two successive spectrum signals with the preset similarity, whether the user correctly wears the earphone can be accurately determined. For example, when the similarity of the two spectrums is higher than 90%, it is deemed that the spectrum signal collected at present is the same as the spectrum signal of the corresponding ear collected when the user correctly wears the earphone for the first time, and then it can be determined that the user has correctly worn the earphone; and on the contrary, it indicates that the user has worn the earphone conversely.

Figure 5:
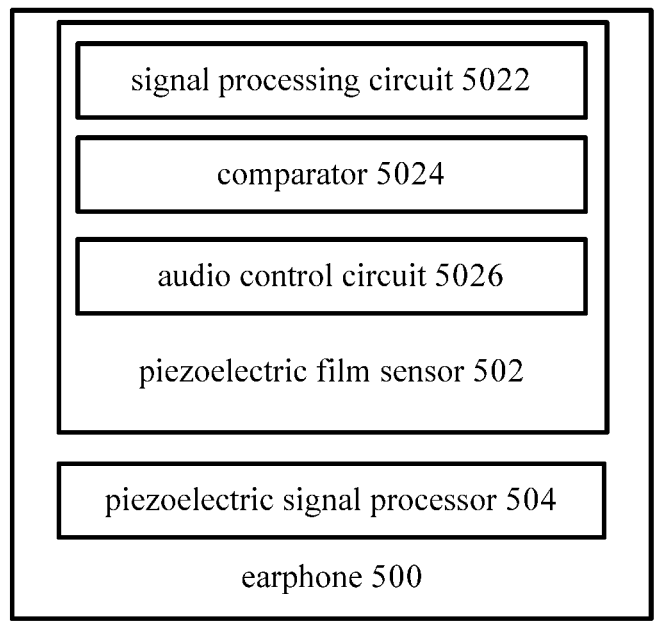
FIG. 5 shows a schematic diagram of a structure of an earphone according to an embodiment of the present invention.

FIG. 5 shows a schematic diagram of a structure of an earphone according to an embodiment of the present invention.

As shown in FIG. 5, the earphone 500 according to the embodiment of the present invention includes: a piezoelectric film sensor 502 arranged on a receiver of the earphone and connected with a control line in the earphone, wherein the piezoelectric film sensor 502 specifically includes: a signal processing circuit 5022 used for, when a user wears the earphone, acquiring left and/or right ear structure information, collected by the earphone, of the user, and sending the left and/or right ear structure information to a comparator; the comparator 5024 connected with the signal processing circuit 5022 and used for determining whether the user correctly wears the earphone according to whether the left and/or right ear structure information matches left and/or right ear structure information acquired by the signal processing circuit when the user correctly wears the earphone for the first time, and sending a control signal to the signal processing circuit when determining that the user does not correctly wear the earphone; and an audio control circuit 5026 connected with the signal processing circuit 5022 and used for receiving the control signal from the signal processing circuit 5022 through the control line and executing a corresponding operation according to the control signal.

In the technical solution, when the comparator in the earphone determines that the structure information of at least one ear of the user collected by the signal processing circuit does not match the structure information of the corresponding ear collected when the user correctly wears the earphone for the first time, the comparator determines that the user wears the earphone conversely, at this time, the comparator will send the control signal to the audio control circuit to allow the audio control circuit to execute a corresponding action according to the control signal, for example, generating a prompt tone to prompt that the user wears the earphone conversely, or automatically switching the sound channels in the earphone, and thus, in the case that the user wears the earphone conversely, the user experience is still very good.

Wherein, the left and/or right ear structure information can be audio or video information reflecting a human ear structure.

In the above technical solution, preferably, the signal processing circuit 5022 is specifically used for: acquiring a pressure signal of the left and/or right ear of the user on the earphone when the user correctly wears the earphone, converting the pressure signal into a level signal, and using the level signal as the left and/or right ear structure information.

In the technical solution, the signal processing circuit collects the pressure signal generated by the left and/or right ear of the user on the earphone and converts the pressure signal into the corresponding level signal, so as to use the level signal as the left and/or right ear structure information, so that the earphone determines whether the user wears the earphone conversely according to whether the level signals match (the user correctly wears the earphone for the first time) when the user successively wears the earphone twice match.

In the above technical solution, preferably, the earphone further includes: a piezoelectric signal processor 504 arranged in a volume control circuit (not shown in FIG. 5) in the earphone and used for sampling, quantifying and encoding the level signal to acquire a spectrum signal, and using the spectrum signal as the left and/or right ear structure information.

In the technical solution, the piezoelectric signal processor samples, quantifies and encodes a continuous level signal to obtain a discrete spectrum signal, the discrete spectrum signal is used as the structure information, compared with the situation that the structure information is an analog signal, the earphone can determine whether the structure information matches the structure information of the corresponding ear collected when the user correctly wears the earphone for the first time more easily and more accurately, namely, the earphone can determine whether the user correctly wears the earphone more accurately and more conveniently.

In the above technical solution, preferably, the piezoelectric film sensor 502 is an annular sensor group.

In the technical solution, since the structure differences of different positions of human ears are little and are very difficult to detect, but these tiny differences are converted into electric signals and then are stored by the annular sensor group, so the structure information of external auditory canals can be sufficiently collected.

Figure 6A:
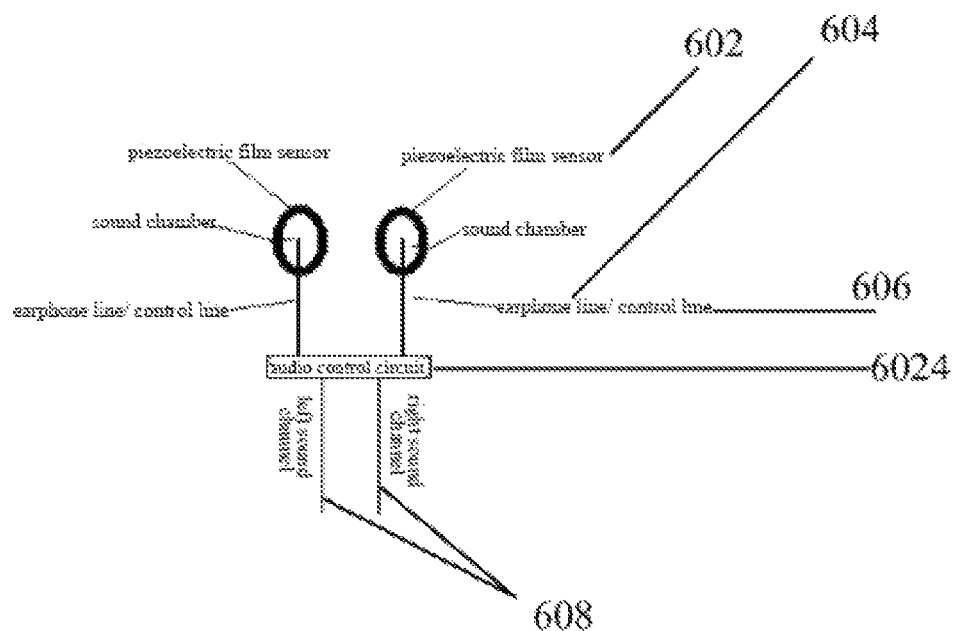
FIG. 6A and FIG. 6B show schematic diagrams of a structure of an earphone according to another embodiment of the present invention.
Figure 6B:
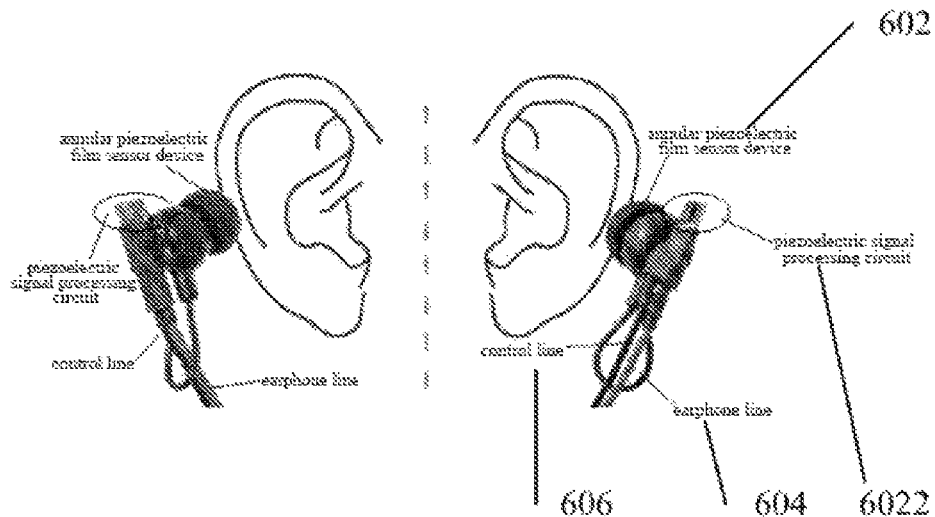

FIG. 6A and FIG. 6B show schematic diagrams of a structure of an earphone according to another embodiment of the present invention.

As shown in FIG. 6A and FIG. 6B, the earphone according to another embodiment of the present invention includes:

an annular piezoelectric film sensor 602, which is distributed on the surrounding of the earphone and is used as a dynamic strain sensor, wherein the annular piezoelectric film sensor can sense tiny differences of human ears, a signal processing circuit 6022 integrated on the annular piezoelectric film sensor can convert these tiny differences into electric signals and store the electric signals, and meanwhile, since the annular piezoelectric film sensor 602 is an annular sensor group, the structure information of external auditory canals can be sufficiently collected;

an earphone line 604/a control line 606, wherein the earphone line 604 is used for transmitting audio, the control line 606 is used for sending a sound channel switching signal, when a piezoelectric signal collected by the film sensor 602 is different from the signal stored for the first time, it is determined that the earphone is worn conversely, then the signal processing circuit 6022 sends the sound channel switching signal to an audio control circuit 6024 through the control line 606 to switch the sound channels in the earphone or send a prompt tone (when the earphone is designed for a human ear structure), thus allowing the user to re-wear the earphone, wherein the earphone line 604 and the control line 606 are independent to avoid spurious trigger, and the audio control circuit 6024 is used for switching left and right sound channels and controlling volume and a play/pause function; and a left and right sound channel transmission line 608 used for transmitting left and right audio signals.

Figure 6C:
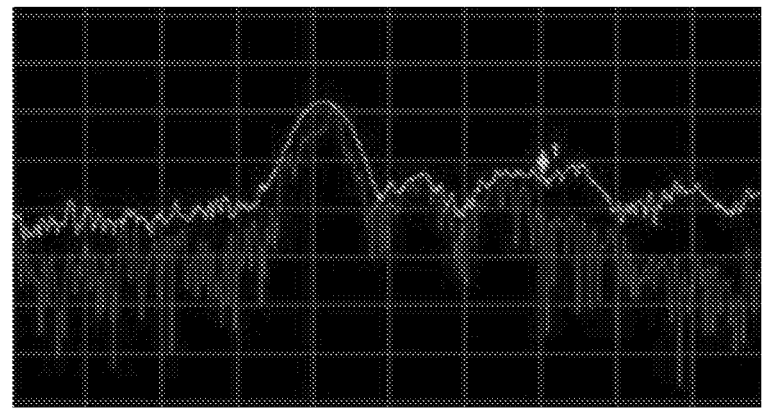
FIG. 6C shows a schematic diagram of a frequency spectrum after processing a level signal collected by a piezoelectric film sensor of the earphone in FIG. 6A and FIG. 6B.

The working principle of the annular piezoelectric film sensor 602 in FIG. 6A and FIG. 6B will be illustrated below in detail:

at first, since the annular piezoelectric film sensor 602 in FIG. 6A and FIG. 6B is very thin, lightweight and very soft, it can sense very tiny change, thereby being very suitable for being applied to a human skin surface or implanted in a human body to collect the structure information of the human body.

in the embodiment, when the user wears the earphone with the annular piezoelectric film sensor 602, the human ear will extrude a piezoelectric polyvinylidene fluoride PVDF polymer film (a piezoelectric film), so that a series of continuous high and low level signals are generated between upper and lower electrodes of the film, however, since the structures of left and right ears are different, the generated signal spectrums are different, as shown in FIG. 6C, a solid line expresses a left ear frequency spectrum, a dotted line expresses a right ear frequency spectrum, when the earphone is randomly worn at next time, the annular piezoelectric film sensors 602 in the left and right ears will generate two frequency spectrums, at this time, comparators (not shown in FIG. 6A and FIG. 6B) in the annular piezoelectric film sensors 602 will compare the obtained frequency spectrums with the frequency spectrum stored for the first time, if the frequency spectrums can be overlapped, it indicates that the user has correctly worn the earphone; and on the contrary, it indicates that the user has worn the earphone conversely, and at this time, an audio processing circuit 6022 will output the sound channel switching signal to the audio control circuit 6024 to switch the left and right sound channels in the earphone.

Of course, since the continuous analog signals collected by the annular piezoelectric film sensors 602 are difficult to be compared and stored, the annular piezoelectric film sensors 602 will transmit the collected continuous analog signals to a piezoelectric signal processing chip (not shown in FIG. 6A and FIG. 6B) on the earphone, so that the piezoelectric signal processing chip samples, quantifies and encodes the signals to obtain a discrete spectrum signal and uses the discrete spectrum signal as the structure information of the left and right ears of the user for storage.

Figure 7:
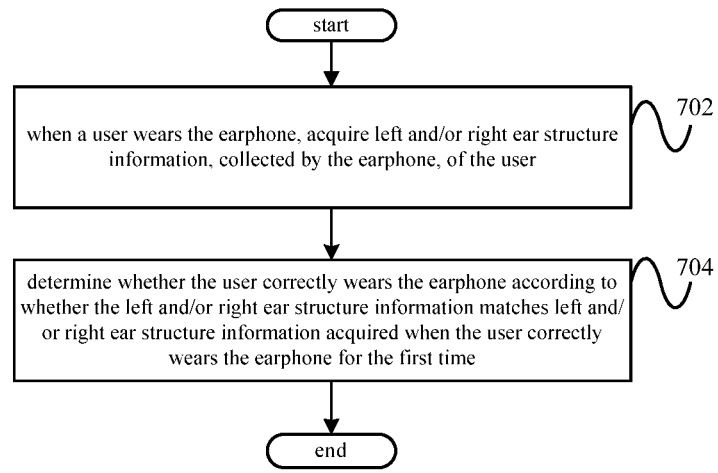
FIG. 7 shows a schematic diagram of a flow of an earphone recognition method according to another embodiment of the present invention.

FIG. 7 shows a schematic diagram of a flow of an earphone recognition method according to another embodiment of the present invention.

As shown in FIG. 7, the earphone recognition method according to another embodiment of the present invention includes: an acquisition step 702: when a user wears the earphone, acquiring left and/or right ear structure information, collected by the earphone, of the user; and a determining step 704: determining whether the user correctly wears the earphone according to whether the left and/or right ear structure information matches left and/or right ear structure information acquired when the user correctly wears the earphone for the first time.

In the technical solution, when the user wears the earphone, the structure information of at least one of the left ear and the right ear collected by the earphone worn by the user is acquired, so that the earphone can compare the structure information with the structure information of the corresponding ear collected when the user correctly wears the earphone for the first time, and can determine whether the user wears the earphone conversely according to a comparison result, namely, when the structure information does not match the structure information of the corresponding ear collected when the user correctly wears the earphone for the first time, it indicates that the user wears the earphone conversely, and on the contrary, the user has correctly worn the earphone.

Wherein, the left and/or right ear structure information can be audio or video information reflecting a human ear structure.

In the above technical solution, preferably, the earphone includes a piezoelectric film sensor, the piezoelectric film sensor includes a signal processing circuit and an audio control circuit, and the recognition method further includes: when the user does not correctly wear the earphone, sending a sound channel switching signal to the audio control circuit by the signal processing circuit to allow the audio control circuit to switch the sound channels in the earphone receiver.

In the technical solution, the earphone includes the piezoelectric film sensor, the audio control circuit is arranged on the piezoelectric film sensor, and is used for receiving the earphone switching signal and automatically switching the sound channels in the earphone after receiving the earphone switching signal, namely exchanging the sound channel in a left receiver with the sound channel in a right receiver, so that when the user wears the earphone conversely, the user can also hear correct high-quality sound without re-wearing the earphone, which is beneficial for the auditory experience of the user.

In the above technical solution, preferably, the earphone recognition method further includes: when the user does not correctly wear the earphone, sending a prompting signal to the audio control circuit by the signal processing circuit to prompt the user to re-wear the earphone.

In the technical solution, if the earphone worn by the user is directed to the human ear structure, when the user does not correctly wear the earphone, the earphone cannot automatically switch the sound channels, at this time, the audio control circuit can prompt the user according to the received prompting signal in a sound or vibration manner, so that when the user does not correctly wear the earphone, the user can re-wear the earphone as soon as possible.

In the above technical solution, preferably, the earphone further includes a piezoelectric signal processor, and the acquisition step specifically includes: when the user wears the earphone, acquiring a pressure signal on the earphone receiver through the signal processing circuit, and converting the pressure signal into a level signal; and sampling, quantifying and encoding the level signal by the piezoelectric signal processor to acquire a spectrum signal, and using the spectrum signal as the left and/or right ear structure information.

In the technical solution, the left and/or right ear structure information is the spectrum signal corresponding to the human ear structure, the spectrum signal is a discrete spectrum signal and is a data signal after sampling, quantifying and encoding, compared with the situation that the structure information is an analog signal, the earphone can more easily and more accurately determine whether the structure information matches the structure information of the corresponding ear collected when the user correctly wears the earphone for the first time, namely, the earphone can more accurately and more conveniently determine whether the user correctly wears the earphone.

In the above technical solution, preferably, the piezoelectric film sensor further includes a comparator, and the determining step specifically includes: when the user wears the earphone, determining, by the comparator, whether the user correctly wears the earphone according to whether the similarity of a received left and/or right ear spectrum signal collected by the piezoelectric film sensor with the left and/or right ear spectrum signal collected by the piezoelectric film sensor when the user correctly wears the earphone for the first time is larger than or equal to preset similarity; and determining that the user does not correctly wear the earphone when the similarity is larger than or equal to the preset similarity, and determining that the user correctly wears the earphone when the similarity is smaller than the preset similarity.

In the technical solution, since the received spectrum signal cannot be completely overlapped with the spectrum signal of the corresponding ear received when the user correctly wears the earphone for the first time, by comparing the relation of the similarity of the two successive spectrum signals with the preset similarity, the comparator can accurately determine whether the user correctly wears the earphone. For example, when the similarity of the two spectrums is higher than 90%, it is deemed that the spectrum signal collected at present is the same as the spectrum signal of the corresponding ear collected when the user correctly wears the earphone for the first time, and then it can be determined that the user has correctly worn the earphone; and on the contrary, it indicates that the user has worn the earphone conversely.

Figure 8:
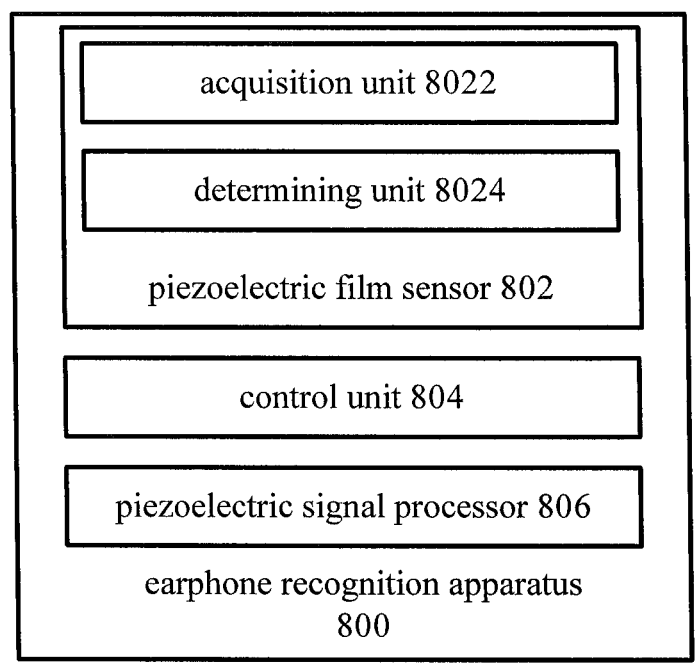
FIG. 8 shows a schematic diagram of a structure of an earphone recognition apparatus according to another embodiment of the present invention.

FIG. 8 shows a schematic diagram of a structure of an earphone recognition apparatus according to another embodiment of the present invention.

As shown in FIG. 8, the earphone recognition apparatus 800 according to another embodiment of the present invention includes: a piezoelectric film sensor 802, and the piezoelectric film sensor 802 includes: an acquisition unit 8022, used for, when a user wears the earphone, acquiring left and/or right ear structure information, collected by the earphone, of the user; and a determining unit 8024, used for determining whether the user correctly wears the earphone according to whether the left and/or right ear structure information matches left and/or right ear structure information acquired when the user correctly wears the earphone for the first time.

In the technical solution, when the user wears the earphone, the structure information of at least one of the left ear and the right ear collected by the earphone worn by the user is acquired, so that the earphone can compare the structure information with the structure information of the corresponding ear collected when the user correctly wears the earphone for the first time, and can determine whether the user wears the earphone conversely according to a comparison result, namely, when the structure information does not match the structure information of the corresponding ear collected when the user correctly wears the earphone for the first time, it indicates that the user wears the earphone conversely, and on the contrary, the user has correctly worn the earphone.

Wherein, the left and/or right ear structure information can be audio or video information reflecting a human ear structure.

In the above technical solution, preferably, the piezoelectric film sensor 802 includes a signal processing circuit and an audio control circuit, and the recognition apparatus further includes: a control unit 804 used for, when the user does not correctly wear the earphone, controlling the signal processing circuit to send a sound channel switching signal to the audio control circuit to allow the audio control circuit to switch the sound channels in the earphone receiver.

In the technical solution, the earphone includes the piezoelectric film sensor 802, the audio control circuit is arranged on the piezoelectric film sensor 802, the audio control circuit is used for receiving the earphone switching signal and automatically switching the sound channels in the earphone after receiving the earphone switching signal, namely exchanging the sound channel in a left receiver with the sound channel in a right receiver, so that when the user wears the earphone conversely, the user can also hear correct high-quality sound without re-wearing the earphone, which is beneficial for the auditory experience of the user.

In the above technical solution, preferably, the control unit 804 is further used for: when the user does not correctly wear the earphone, controlling the signal processing circuit to send a prompting signal to the audio control circuit to prompt the user to re-wear the earphone.

In the technical solution, if the earphone worn by the user is directed to the human ear structure, when the user does not correctly wear the earphone, the earphone cannot automatically switch the sound channels, at this time, the audio control circuit can prompt the user according to the received prompting signal in a sound or vibration manner, so that when the user does not correctly wear the earphone, the user can re-wear the earphone as soon as possible.

In the above technical solution, preferably, the earphone recognition apparatus further includes a piezoelectric signal processor 806, and the acquisition unit 8022 is specifically used for: when the user wears the earphone, acquiring a pressure signal on the earphone receiver, converting the pressure signal into a level signal, sampling, quantifying and encoding the level signal by the piezoelectric signal processor 806 to acquire a spectrum signal, and using the spectrum signal as the left and/or right ear structure information.

In the technical solution, the left and/or right ear structure information is the spectrum signal corresponding to the human ear structure, the spectrum signal is a discrete spectrum signal and is a data signal after sampling, quantifying and encoding, compared with the situation that the structure information is an analog signal, the earphone can more easily and more accurately determine whether the structure information matches the structure information of the corresponding ear collected when the user correctly wears the earphone for the first time, namely, the earphone can more accurately and more conveniently determine whether the user correctly wears the earphone.

In the above technical solution, preferably, the determining unit 8024 is a comparator, and the comparator is specifically used for: when the user wears the earphone, determining whether the user correctly wears the earphone according to whether the similarity of an acquired left and/or right ear spectrum signal with the left and/or right ear spectrum signal acquired when the user correctly wears the earphone for the first time is larger than or equal to preset similarity, and when the similarity is larger than or equal to the preset similarity, determining that the user does not correctly wear the earphone, and when the similarity is smaller than the preset similarity, determining that the user correctly wears the earphone.

In the technical solution, since the received spectrum signal cannot be completely overlapped with the spectrum signal of the corresponding ear received when the user correctly wears the earphone for the first time, by comparing the relation of the similarity of the two successive spectrum signals with the preset similarity, the comparator can accurately determine whether the user correctly wears the earphone. For example, when the similarity of the two spectrums is higher than 90%, it is deemed that the spectrum signal collected at present is the same as the spectrum signal of the corresponding ear collected when the user correctly wears the earphone for the first time, and then it can be determined that the user has correctly worn the earphone; and on the contrary, it indicates that the user has worn the earphone conversely.

Figure 9:
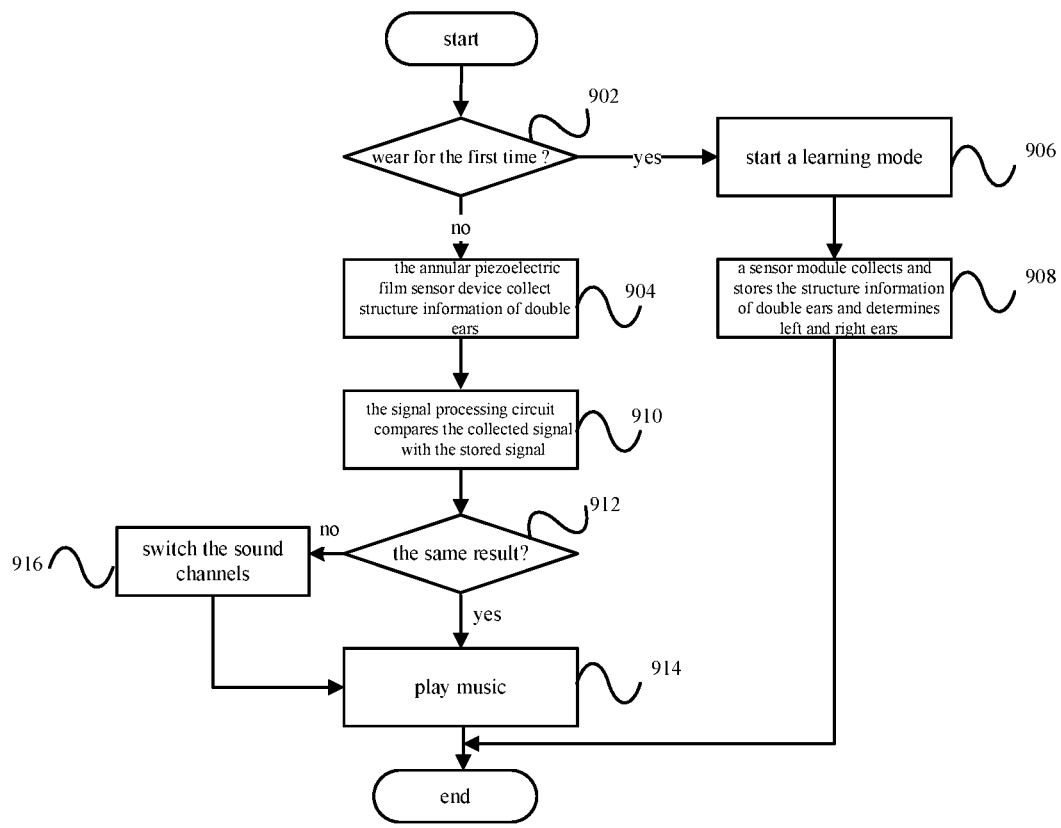
FIG. 9 shows a schematic diagram of a flow of an earphone recognition method according to a third embodiment of the present invention.

FIG. 9 shows a schematic diagram of a flow of an earphone recognition method according to a third embodiment of the present invention.

As shown in FIG. 9, the earphone recognition method according to the third embodiment of the present invention includes:

step 902, when a user wears an earphone, whether the user correctly wears the earphone for the first time is determined, if so, a step 906 is executed; and otherwise, a step 904 is executed.

Step 906, a learning mode of the earphone is started to record the ear structure information acquired when the user correctly wears the earphone for the first time.

Step 908, ear structure information collected by a piezoelectric signal processor in the earphone is collected and stored to determine left and right ears.

Step 904, the ear structure information acquired when the user wears the earphone at present is collected.

Step 910, the ear structure information acquired when the user wears the earphone at present is compared with the ear structure information acquired when the user correctly wears the earphone for the first time.

Step 912, whether the ear structure information acquired when the user wears the earphone at present is the same as the ear structure information acquired when the user correctly wears the earphone for the first time is determined, if so, step 914 is executed; and otherwise, step 916 is executed.

Step 914, music is played.

Step 916, when the result is different, it indicates that the user wears the earphone conversely, and then the left and right sound channels in the earphone are switched.

Figure 10:
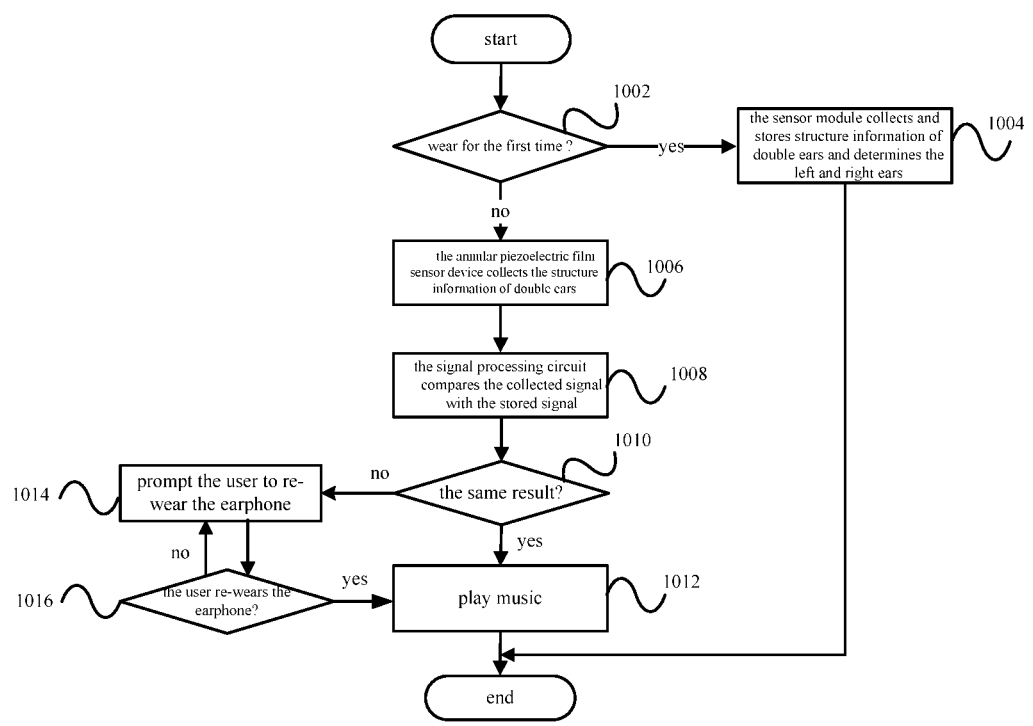
FIG. 10 shows a schematic diagram of a flow of an earphone recognition method according to a fourth embodiment of the present invention.

FIG. 10 shows a schematic diagram of a flow of an earphone recognition method according to a fourth embodiment of the present invention.

As shown in FIG. 10, the earphone recognition method according to the fourth embodiment of the present invention includes:

Step 1002, when the user wears an earphone targeting a human ear structure, whether the user wears the earphone for the first time is determined, if so, a step 1004 is executed; and otherwise, a step 1006 is executed.

Step 1004, ear structure information collected by a piezoelectric signal processor in the earphone is collected and stored to determine left and right ears.

Step 1006, the annular piezoelectric signal processor collects the ear structure information acquired when the user wears the earphone at present.

Step 1008, the ear structure information acquired when the user wears the earphone at present is compared with the ear structure information acquired when the user correctly wears the earphone for the first time.

Step 1010, whether the ear structure information acquired when the user wears the earphone at present is the same as the ear structure information acquired when the user correctly wears the earphone for the first time is determined, if so, step 1012 is executed; and otherwise, step 1014 is executed.

Step 1012, music is played.

Step 1014, when the result is different, it indicates that the user wears the earphone conversely, and then the left and right sound channels in the earphone are switched.

Step 1016, whether the user re-wears the earphone is determined, and when the user does not re-wear the earphone, step 1014 is executed again.

According to the embodiment of the present invention, a program product stored on a nonvolatile machine-readable medium is further provided, the program product is applied to earphone recognition in a terminal, and the program product includes a machine executable instruction used for driving a computer system to execute the following steps: when a user wears the earphone, acquiring left and/or right ear structure information, collected by the earphone, of the user; and sending the left and/or right ear structure information to a terminal, so that the terminal determines whether the user correctly wears the earphone according to whether the left and/or right ear structure information matches left and/or right ear structure information acquired when the user correctly wears the earphone for the first time.

According to the embodiment of the present invention, a nonvolatile machine-readable medium is further provided, on which a program product for earphone recognition in a terminal is stored, and the program product includes a machine executable instruction used for driving a computer system to execute the following steps: when a user wears the earphone, acquiring left and/or right ear structure information, collected by the earphone, of the user; and sending the left and/or right ear structure information to a terminal, so that the terminal determines whether the user correctly wears the earphone according to whether the left and/or right ear structure information matches left and/or right ear structure information acquired when the user correctly wears the earphone for the first time.

According to the embodiment of the present invention, a machine readable program is further provided, and the program drives a machine to execute the earphone recognition method in any above technical solution.

According to the embodiment of the present invention, a storage medium with a machine readable program stored thereon is further provided, wherein the machine readable program drives a machine to execute the earphone recognition method in any above technical solution.

According to the embodiment of the present invention, a program product stored on a nonvolatile machine-readable medium is further provided, the program product is applied to an earphone control method, and the program product includes a machine executable instruction used for driving a computer system to execute the following steps: receiving left and/or right ear structure information of a user from the earphone; determining whether the user correctly wears the earphone according to whether the received left and/or right ear structure information matches left and/or right ear structure information received when the user correctly wears the earphone for the first time; and sending a control instruction to the earphone when the determination result is that the user does not correctly wear the earphone, thus allowing the earphone to execute a corresponding operation according to the control instruction.

According to the embodiment of the present invention, a nonvolatile machine-readable medium is further provided, on which a program product for earphone control in a terminal is stored, and the program product includes a machine executable instruction used for driving a computer system to execute the following steps: receiving left and/or right ear structure information of a user from the earphone; determining whether the user correctly wears the earphone according to whether the received left and/or right ear structure information matches left and/or right ear structure information received when the user correctly wears the earphone for the first time; and sending a control instruction to the earphone when the determination result is that the user does not correctly wear the earphone, thus allowing the earphone to execute a corresponding operation according to the control instruction.

According to the embodiment of the present invention, a machine readable program is further provided, and the program drives a machine to execute the earphone control method in any above technical solution.

According to the embodiment of the present invention, a storage medium with a machine readable program stored thereon is further provided, wherein the machine readable program drives a machine to execute the earphone control method in any above technical solution.

According to the embodiment of the present invention, a program product stored on a nonvolatile machine-readable medium is further provided, the program product is applied to an earphone recognition method, and the program product includes a machine executable instruction used for driving a computer system to execute the following steps: when a user wears the earphone, acquiring left and/or right ear structure information, collected by the earphone, of the user; and determining whether the user correctly wears the earphone according to whether the left and/or right ear structure information matches left and/or right ear structure information acquired when the user correctly wears the earphone for the first time.

According to the embodiment of the present invention, a nonvolatile machine-readable medium is further provided, on which a program product for earphone recognition in a terminal is stored, and the program product includes a machine executable instruction used for driving a computer system to execute the following steps: when a user wears the earphone, acquiring left and/or right ear structure information, collected by the earphone, of the user; and determining whether the user correctly wears the earphone according to whether the left and/or right ear structure information matches left and/or right ear structure information acquired when the user correctly wears the earphone for the first time.

According to the embodiment of the present invention, a machine readable program is further provided, and the program drives a machine to execute the earphone recognition method in any above technical solution.

According to the embodiment of the present invention, a storage medium with a machine readable program stored thereon is further provided, wherein the machine readable program drives a machine to execute the earphone recognition method in any above technical solution.

The technical solutions of the present invention have been illustrated above in detail in combination with the accompany drawings, when the user wears the earphone conversely, the user can still hear proper high-quality sound, and further, the listening experience of the user is improved.

The foregoing descriptions are merely preferred embodiments of the present invention, rather than limiting the present invention, and for those skilled in the art, the present invention can have a variety of variations and modifications. Any modifications, equivalent substitutions, improvements or the like made within the spirit and principle of the present invention shall fall into the protection scope of the present invention.

The invention claimed is:

1. An earphone control method, applied to a terminal, comprising:
   a receiving step: receiving left and/or right ear structure information of a user from the earphone;
   a determining step: determining whether the user correctly wears the earphone according to whether the received left and/or right ear structure information matches left and/or right ear structure information received when the user correctly wears the earphone for the first time; and
   a sending step: sending a control instruction to the earphone when the determination result is that the user does not correctly wear the earphone, thus allowing the earphone to execute a corresponding operation according to the control instruction,
   wherein the determining step specifically comprises:
   determining whether the user correctly wears the earphone according to whether the similarity of a received left and/or right ear spectrum signal, sent by the earphone, of the user with the left and/or right ear spectrum signal received when the user correctly wears the earphone for the first time is larger than or equal to preset similarity; and
   determining that the user does not correctly wear the earphone when the similarity is larger than or equal to the preset similarity, and determining that the user correctly wears the earphone when the similarity is smaller than the preset similarity.

2. The earphone control method of claim 1, wherein the sending step specifically comprises:
   sending a sound channel switching signal to an audio control circuit in the earphone when the determination result is that the user does not correctly wear the earphone, thus allowing the audio control circuit to switch the sound channels in the earphone receiver.

3. The earphone control method of claim 1, wherein the sending step further specifically comprises:
   sending a prompting signal to the audio control circuit in the earphone to prompt the user to re-wear the earphone when the determination result is that the user does not correctly wear the earphone.

4. An earphone recognition method, comprising:
   an acquisition step: when a user wears the earphone comprising a piezoelectric film sensor and a piezoelectric signal processor, the piezoelectric film sensor comprises a signal processing circuit and an audio control circuit, acquiring left and/or right ear structure information, collected by the earphone, of the user, wherein the acquisition step specifically comprises, when the user wears the earphone, acquiring a pressure signal on the earphone receiver through the signal processing circuit, and converting the pressure signal into a level signal; and sampling, quantifying and encoding the level signal by the piezoelectric signal processor to acquire a spectrum signal, and using the spectrum signal as the left and/or right ear structure information; and a determining step: determining whether the user correctly wears the earphone according to whether the left and/or right ear structure information matches left and/or right ear structure information acquired when the user correctly wears the earphone for the first time, wherein when the user does not correctly wear the earphone, sending a sound channel switching signal to the audio control circuit by the signal processing circuit to allow the audio control circuit to switch the sound channels in the earphone receiver.

5. The earphone recognition method of claim 4, further comprising:
when the user does not correctly wear the earphone, sending a prompting signal to the audio control circuit by the signal processing circuit to prompt the user to re-wear the earphone.

6. The earphone recognition method of claim 4, wherein the piezoelectric film sensor further comprises a comparator, and the determining step specifically comprises:
when the user wears the earphone, determining, by the comparator, whether the user correctly wears the earphone according to whether the similarity of a received left and/or right ear spectrum signal collected by the piezoelectric film sensor with the left and/or right ear spectrum signal collected by the piezoelectric film sensor when the user correctly wears the earphone for the first time is larger than or equal to preset similarity; and
determining that the user does not correctly wear the earphone when the similarity is larger than or equal to the preset similarity, and determining that the user correctly wears the earphone when the similarity is smaller than the preset similarity.

7. An earphone recognition method, comprising:
an acquisition step: when a user wears the earphone comprising a piezoelectric film sensor and a piezoelectric signal processor, the piezoelectric film sensor comprises a signal processing circuit and an audio control circuit, acquiring left and/or right ear structure information, collected by the earphone, of the user, the acquisition step specifically comprises:
when the user wears the earphone, acquiring a pressure signal on the earphone receiver through the signal processing circuit, and converting the pressure signal into a level signal; and
sampling, quantifying and encoding the level signal by the piezoelectric signal processor to acquire a spectrum signal, and using the spectrum signal as the left and/or right ear structure information; and
a determining step: determining whether the user correctly wears the earphone according to whether the left and/or right ear structure information matches left and/or right ear structure information acquired when the user correctly wears the earphone for the first time, when the user does not correctly wear the earphone, sending a sound channel switching signal to the audio control circuit by the signal processing circuit to allow the audio control circuit to switch the sound channels in the earphone receiver and when the user does not correctly wear the earphone, sending a prompting signal to the audio control circuit by the signal processing circuit to prompt the user to re-wear the earphone.

8. The earphone recognition method of claim 7, wherein the piezoelectric film sensor further comprises a comparator, and the determining step specifically comprises:
when the user wears the earphone, determining, by the comparator, whether the user correctly wears the earphone according to whether the similarity of a received left and/or right ear spectrum signal collected by the piezoelectric film sensor with the left and/or right ear spectrum signal collected by the piezoelectric film sensor when the user correctly wears the earphone for the first time is larger than or equal to preset similarity; and
determining that the user does not correctly wear the earphone when the similarity is larger than or equal to the preset similarity, and determining that the user correctly wears the earphone when the similarity is smaller than the preset similarity.

\* \* \* \* \*